No. 673,913. Patented May 14, 1901.
B. G. LAMME.
SYSTEM OF ELECTRICAL DISTRIBUTION.
(Application filed July 14, 1900.)
(No Model.)
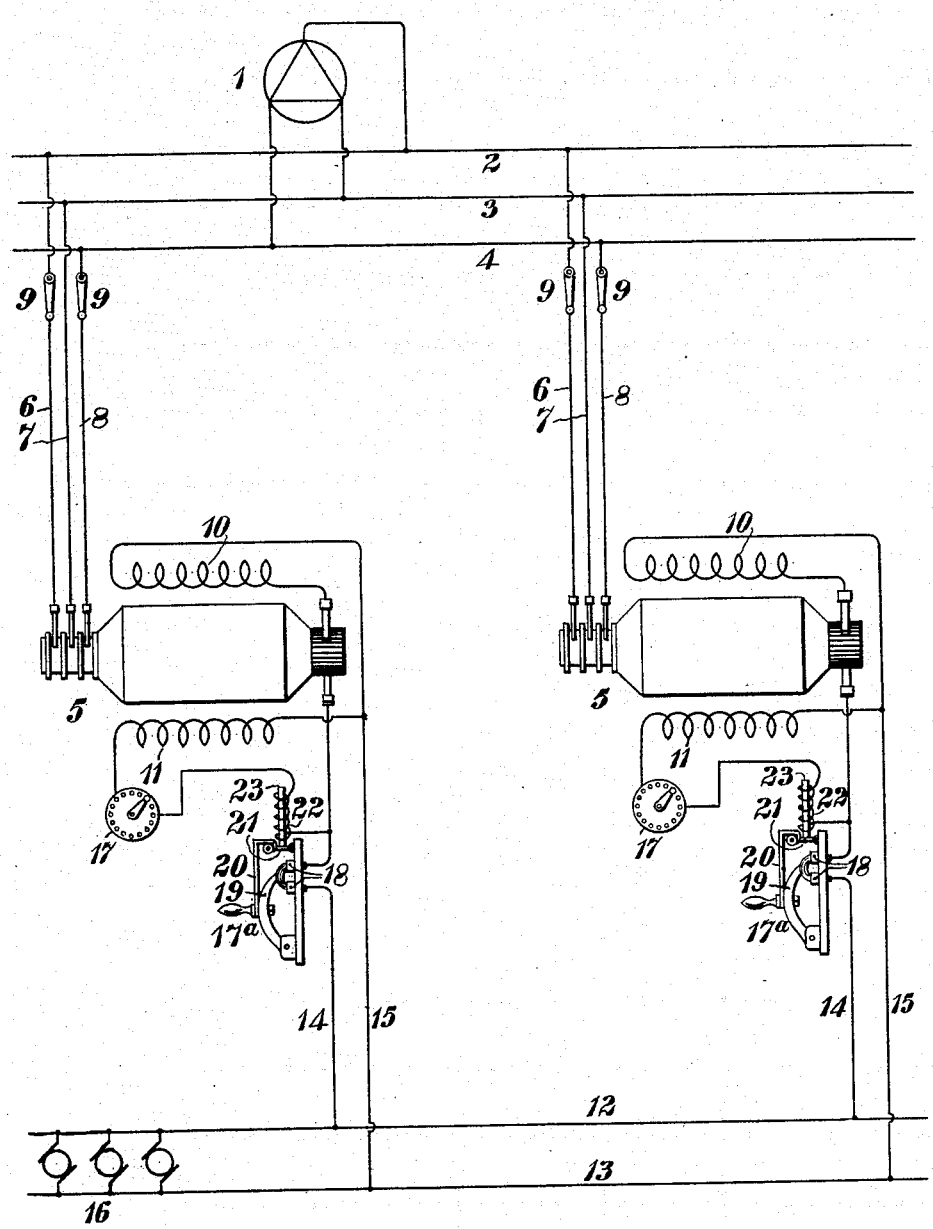
WITNESSES:
C. L. Belcher
Birney Hines
INVENTOR
Benjamin G. Lamme
BY
Hurley E. Carr
ATTORNEY.

UNITED STATES PATENT OFFICE.

BENJAMIN G. LAMME, OF PITTSBURG, PENNSYLVANIA, ASSIGNOR TO THE WESTINGHOUSE ELECTRIC & MANUFACTURING COMPANY, OF PENNSYLVANIA.

SYSTEM OF ELECTRICAL DISTRIBUTION.

SPECIFICATION forming part of Letters Patent No. 673,913, dated May 14, 1901.

Application filed July 14, 1900. Serial No. 23,655. (No model.)

*To all whom it may concern:*

Be it known that I, BENJAMIN G. LAMME, a citizen of the United States, residing at Pittsburg, in the county of Allegheny and State of Pennsylvania, have invented new and useful Improvements in Systems of Electrical Distribution, of which the following is a specification.

My invention relates to systems of electrical distribution, and particularly to such systems as involve the conversion of alternating currents into direct currents by means of rotary converters and the operation of translating devices by the direct current thus produced.

The object of my invention is to provide a safety device for systems of the character above indicated which shall serve to automatically cut any converter of the system out of circuit when the magnetizing-current for the field-magnet falls below a predetermined safety limit. With these ends in view I have devised the means shown in the accompanying drawing, the single figure of which is a diagram of an alternating-current circuit, a direct-current circuit, and two rotary converters and their protecting devices.

It is customary in modern practice, where transmission of electrical energy over long distances for supplying translating devices, such as railway-motors, is required, to generate and transmit alternating-current energy and to transform such energy at a distance from the main generating-station by means of rotary converters into direct-current energy for the motors. In such systems there is no danger to the rotary converters from racing or excessive speeds so long as the rotary converters are running in synchronism with the alternating-current system. Under such conditions the field-magnet currents of the rotary converters may be varied over a wide range without endangering the converters or the system, since the alternating armature current varies in such manner as to give an opposite magnetizing effect, and thus serve to hold the field-induction approximately constant. It is sometimes found both feasible and desirable, particularly where the winding is of the compound variety, to considerably weaken the field-magnet current in order to cause the alternating-current system to supply a lagging current at no load which may change to a leading current under heavy loads by reason of the energizing action of the series field-magnet winding. In other cases the series field-magnet current may be stronger than is desired, and the shunt field-magnet current will therefore be weakened correspondingly to give the desired field strength. Under either of the conditions stated if the alternating-current-supply circuit to the rotary converter should be opened the series field would at once be weakened and then reversed by reason of the current supplied to the converter from the other converters of the system through the direct-current mains, which would thus serve to drive the converter as a direct-current motor. In view of the removal of the corrective component of the alternating current by reason of the interruption of the supply-circuit the converter would quickly attain a dangerous speed provided the field had been unduly reduced prior to the interruption of the alternating-current circuit. In order to avoid the difficulties arising under the conditions above stated as well as when the shunt field-magnet circuit is interrupted, I provide a protecting device that holds the direct-current circuit leading from each rotary converter closed so long as the shunt field-current does not fall below a predetermined safety limit, but which opens the direct-current circuit when the shunt field-current is reduced below the safety limit or is interrupted by the breaking of its circuit.

It will be understood from the foregoing statement that the degree of weakening of the converter-field is of no material consequence so long as the alternating-current-supply circuit remains closed, but that it is important to guard against excessive reductions in field strength on account of either carelessness or accident in order that damage may be avoided in the event of unexpected interruptions of the supply-circuit.

Referring now to the drawing, I have shown a three-phase alternating-current generator 1 supplying three-phase mains 2, 3, and 4. It will be understood without further illustration that any desired number of generators may be connected to the mains in parallel, that such generators may be constructed and arranged to supply currents of a different number of phases than three, and that instead of supplying the mains directly they may supply the energy through step-up transformers. All of these variations are well known in the art.

The energy transmitted through the mains 2, 3, and 4 is supplied to one or more rotary converters 5 through conductors 6, 7, and 8. Two of such converters are shown; but it will be understood that any number greater or less than two may be employed, if desired. Suitable circuit-breaking devices 9 may be employed for interrupting two or more of the conductors 6, 7, and 8 when the currents flowing therethrough become excessive. I have shown diagrammatically a circuit-breaking device for each of conductors 6 and 8, these being all that would be necessary in a three-phase circuit, and, in fact, a single device properly constructed to simultaneously open the two sides of the circuit might be employed. Each of the rotary converters 5 is shown as provided with a series field-magnet winding 10 and a shunt field-magnet winding 11, the current in which is regulated by means of an adjustable rheostat 17, and as supplying the direct-current mains 12 and 13 through conductors 14 and 15, translating devices being indicated at 16. In order to interrupt the circuit 14 and 15, I provide a circuit-breaker 17$^a$, the stationary contact-terminals 18 of which are bridged by movable contact member 19 when the circuit-breaker is closed, so as to complete the circuit. The movable member 19 is provided with a suitable hook or arm 20, which is engaged by a latch 21 under normal conditions of operation. This latch is held in locking position by means of a coil 22, that is connected in series with the shunt-winding 11, the armature of the core 23 of the coil being attached to the latch 21. A double-pole circuit-breaker might be employed in lieu of the single-pole construction shown, if desired, both forms being well known in the art. The arrangement of the locking and releasing coil with reference to the field-magnet winding of the rotary converter may also be different from that shown, if desired, it being only necessary that the locking and releasing device be acted upon either directly or indirectly by the field-current of the converter, so that if the field-magnet winding is opened or is weakened beyond a certain limit the circuit-breaker will be released and an excessive rise in speed of the converter be thus prevented in case an interruption of the alternating-current-supply circuit occurs.

The apparatus illustrated and described in so far as it embodies details of construction is intended to be merely illustrative of any suitable means for effecting the results specified and not as limiting the invention to such details.

I claim as my invention—

1. In a system of electrical distribution in which alternating-current energy is converted into direct-current energy for supplying translating devices, the combination with a rotary converter having a shunt field-magnet winding, of a circuit-breaker for the circuit supplied by the converter having a locking-coil in series with the shunt-winding of the converter.

2. The combination with a source of alternating currents and one or more rotary converters having shunt and series field-magnet windings, of a circuit-breaker for each rotary converter having a locking-coil connected with the shunt field-magnet winding.

3. The combination with a rotary converter having a compound wound field-magnet and operating to supply translating devices with direct current from a source of alternating currents, of a circuit-breaker for the direct-current circuit having a coil that is energized from the field-magnet circuit of the rotary converter to lock the breaker in closed position under normal conditions and serves to release the breaker when the shunt field-current falls below a predetermined safety limit.

4. The combination with an alternating-current circuit, a direct-current circuit and one or more rotary converters for transferring energy from the one circuit to the other, of a circuit-breaker for the direct-current end of each converter provided with a locking and releasing device controlled by the field-magnet current of the converter.

5. The combination with an alternating-current circuit, a direct-current circuit and one or more rotary converters for transferring energy from the one circuit to the other, of a circuit-breaker for the direct-current end of each converter having a locking and releasing device controlled by the converter field-magnet current so that any decrease of said current below a predetermined safety limit will effect the release of the breaker.

In testimony whereof I have hereunto subscribed my name this 9th day of July, 1900.

BENJ. G. LAMME.

Witnesses:
 WESLEY G. CARR,
 BIRNEY HINES.